T. C. McGRIFF.
WHEEL.
APPLICATION FILED MAY 13, 1918.
1,305,730.
Patented June 3, 1919.
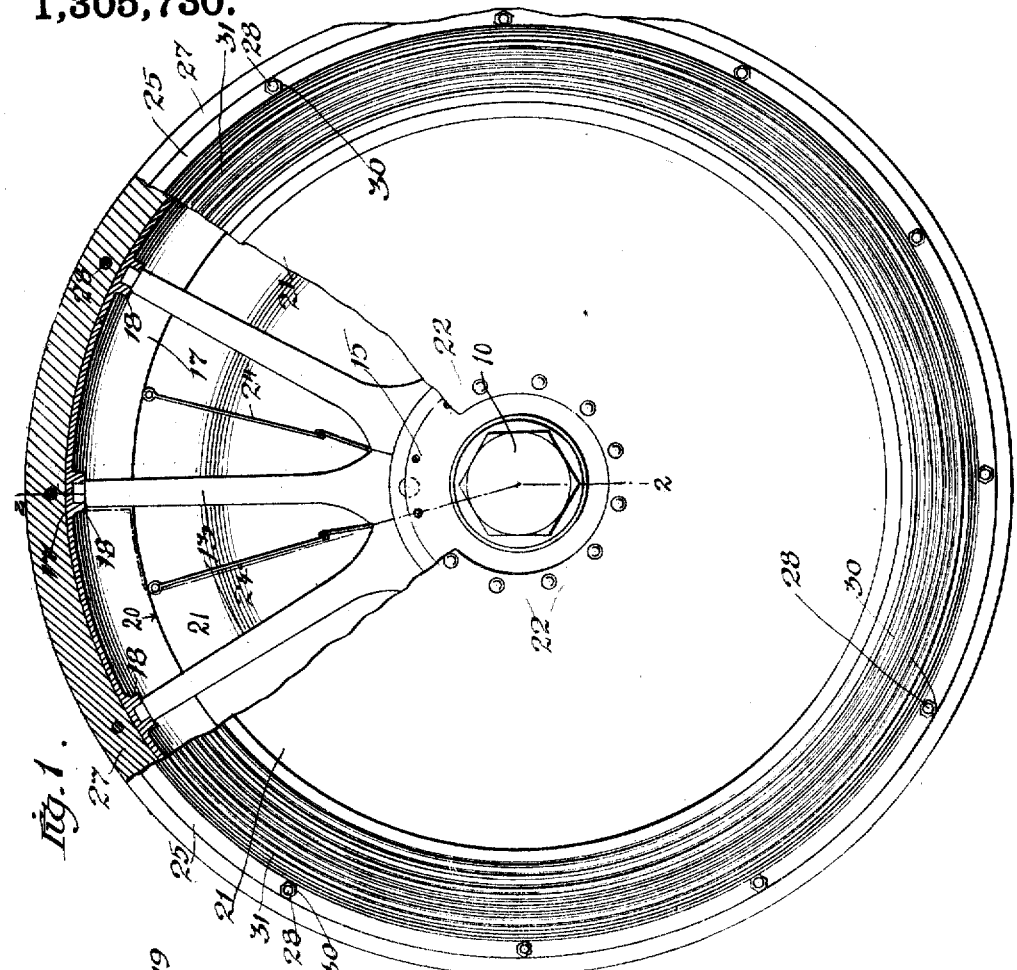
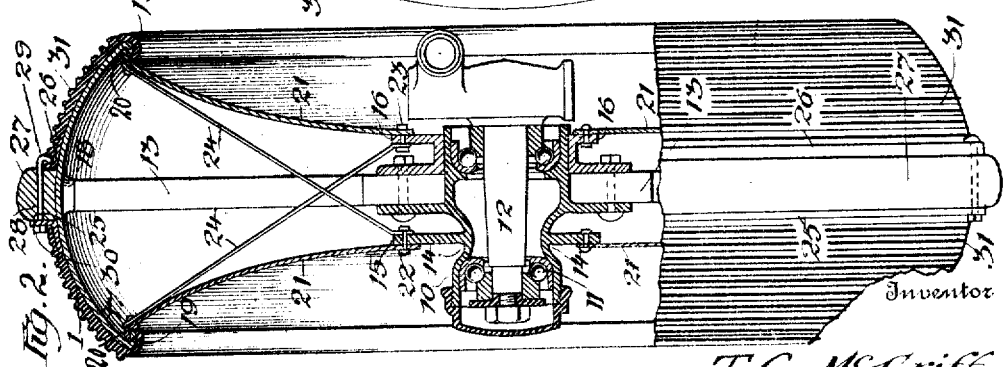
Inventor
T. C. McGriff.
By
Lacey & Lacey, Attorney

UNITED STATES PATENT OFFICE.

THOMAS CARY McGRIFF, OF WINNEMUCCA, NEVADA, ASSIGNOR OF ONE-FOURTH TO WILLIAM J. KELSEY AND ONE-FOURTH TO FRANK L. KELSEY, BOTH OF WINNEMUCCA, NEVADA.

WHEEL.

1,305,730.     Specification of Letters Patent.     Patented June 3, 1919.

Application filed May 13, 1918. Serial No. 234,295.

*To all whom it may concern:*

Be it known that I, THOMAS CARY MC-GRIFF, a citizen of the United States, residing at Winnemucca, in the county of Humboldt and State of Nevada, have invented certain new and useful Improvements in Wheels, of which the following is a specification.

This invention relates to improvements in wheels, more particularly to wheels employed in connection with auto trucks and similar vehicles for hauling heavy loads, and has for one of its objects to provide a wheel adapted to effectually support the body of the truck and its load while passing over soft and muddy roads, or roads having a rough or uneven surface.

Another object of the invention is to provide a wheel having a relatively wide bearing surface which becomes effective when the wheel encounters soft or muddy places in the road, and which will remain inactive while passing over the harder portions of the road.

Another object of the invention is to provide a wheel having means whereby the tractive force is increased when the wheel encounters soft or muddy portions of the road.

With these and other objects in view, the invention consists in certain novel features of construction, as hereinafter shown and described and then specifically pointed out in the claims; and in the drawings illustrative of the preferred embodiment of the invention—

Figure 1 is a side elevation partly in section of a wheel constructed in accordance with the invention.

Fig. 2 is an edge view of the wheel with the parts in section on the line 2—2 of Fig. 1.

The improved wheel includes a hub portion indicated as a whole at 10, and preferably with suitable ball bearings 11 to engage the journal 12 of the axle. The improved wheel is designed more particularly for use on heavy auto trucks, and for the purpose of illustration is shown applied to a conventional axle journal of a truck of this class. The spokes of the wheel, represented at 13, are secured to the hub in the ordinary manner, the hub including a sleeve member 14 having annular disks or flanges 15—16 spaced from the opposite faces of the spoke holding flanges.

The rim portion of the improved wheel, represented as a whole at 17, is pressed from sheet metal, preferably steel, and into the center of which the spokes 13 are secured at their outer ends as represented at 18. The rim 17 slopes toward the center of the wheel at each side of the medial line of said rim as represented in Fig. 2, and thus presents a relatively wide outer or tread face to the road.

The edges of the rim 17 are rolled inwardly as represented at 19, and engaging the rolled portions are the outer edges 20 of inwardly dished webs or diaphragm 21. The webs 21 are centrally apertured and bear against the outer faces of the disks 15—16 and riveted or otherwise secured thereto as shown at 22—23. By this means a very rigid and strong metallic wheel is produced, as light as possible consistent with the strains to which it will be subjected. The reversely curved outer faces of the rim 17 and the inwardly curved webs or diaphragm 21 coact to materially strengthen and brace the wheel and enable it to effectually resist the severe strains to which it will be subjected when in use. Connected to the disks or flanges 15—16 and to the outer portions of the web 21, are obliquely directed wire braces 24, the braces crossing each other between the spokes, as shown. By this means the rigidity of the wheel is materially increased without material increase in weight or expense.

Attached to the outer face of the rim 17 and at one side of the center thereof, is an outwardly directed stop flange 25, and connected to the outer face of the rim 17 at the opposite side of the center is a combined stop and lip device 26. The space between the members 25—26 forms an annular seat for a tire 27, preferably of hard rubber of the consistency usually employed in the rubber tires of wheels. The stop flange 25 is pierced at suitable intervals to receive tie bolts 28, the latter passing through the tire 27 and each being provided with a terminal hook 29 to engage the lip of the member 26. The bolts are threaded to receive clamp nuts 30. By this simple means the tire is firmly clamped in position upon the rim.

Bearing upon the outer face of the rim 17 are shoes 31 of rubber or like material preferably corrugated or indented to increase their tractive force.

By this arrangement a wheel is produced which will be very effectual when pulling loads over soft or muddy ground or sand, as the tractive force will increase with the weight upon the truck. The tire 27 projects for a considerable distance beyond the outer face of the rim 17 and its shoe 31, so that when the vehicle is running over ordinary hard roads the laterally widened and sloping rim is nonoperative, and becomes active only when the wheel encounters soft or sandy portions of the road. Thus the presence of the sloping rim portion does not interfere with the ordinary uses of the wheel, or affect its operation when running over hard roads.

The improved wheel will likewise be found of great advantage when running over chuck holes or other uneven places in the road, as the sloping rim portions 17 will prevent the wheel from dropping into such depressions.

The members 25 and 26 are of sufficient strength to serve as holding flanges to enable the automobile to run upon an ordinary railway track when the rubber tire 27 is detached.

Having thus described the invention, what is claimed as new is:

1. A vehicle wheel including a hub, a rim sloping from a medial line toward the axial line of the hub, coacting webs united respectively to the hub and to the outer edges of the rim, annular guard members attached to the rim in spaced relation, a tire engaging the rim between the guard members and shoes of yieldable material fitted to the rim on opposite sides of the tire.

2. A vehicle wheel including a hub, a rim sloping from a medial line toward the axial line of the hub, coacting webs united respectively to the hub and to the outer edges of the rim, an annular guard member attached to the rim at one side of the medial line thereof, a combined annular lip device and guard member attached to the rim at the other side of the medial line, a tire engaging the rim between the guard members, fastening devices extending through the guard member and the tire and having hooked terminals engaging over the lip device and continuous traction shoes extending uninterruptedly around the circumference of the rim on opposite sides of the tire.

3. A vehicle wheel including a hub, a rim sloping from a medial line toward the axial line of the hub and having its edges rolled inwardly, coacting webs united respectively to the hub and to the rolled edges of the rim, a tire bearing upon said rim and braces connected respectively to the webs at the rolled edges of the rim and to said hub.

4. A vehicle wheel including a hub, a rim sloping from a medial line toward the axial line of the hub, coacting webs united respectively to the hub and to the outer edges of the rim, a tire bearing upon said rim, and yieldable shoes bearing upon said rim, at each side of the tire.

5. A vehicle wheel including a hub and spokes, a rim engaged by said spokes and sloping from a medial line toward the axial line of the hub, and having its outer edges rolled inwardly, coacting webs united respectively to the hub and to the inner faces of the rolled edges of the rim and a tire bearing upon said rim.

6. A vehicle wheel including a hub and spokes, a rim engaged by said spokes and sloping from a medial line toward the axial line of the hub, coacting webs united respectively to the hub and to the outer edges of the rim, and braces connected respectively to said webs and to said hub.

7. A vehicle wheel including a hub having spaced upstanding flanges, a rim sloping from the medial line toward the axial line of the hub and having its outer edges rolled inwardly, webs connected with the flanges of the hub and with the rolled edges of the rim, a tire extending around the rim at the medial line thereof, and yieldable shoes encircling the rim on opposite sides of the tire and having their edges rolled to conform to and bearing against the rolled edges of the rim.

8. A vehicle wheel including a hub having spaced flanges and provided with spokes disposed between said flanges, a rim secured to the spokes and sloping from the medial line toward the axial line of the hub, the outer edges of the rim being rolled inwardly, webs secured to the outer faces of the flanges and to the inner faces of the rolled edges of the rim, intersecting braces secured to the inner faces of the flanges and to the webs at their points of attachment to the rim, a tire encircling the rim at the center thereof, and traction shoes mounted on the rim on opposite sides of the tire, said traction shoes being of less thickness than the tire and having their edges conforming to and bearing against the rolled edges of the rim.

In testimony whereof I affix my signature.

THOMAS CARY McGRIFF. [L. S.]

Copies of this patent may be obtained for five cents each, by addressing the "Commissioner of Patents, Washington, D. C."